(12) United States Patent
Kostov et al.

(10) Patent No.: US 11,070,492 B2
(45) Date of Patent: *Jul. 20, 2021

(54) POOLING PUBLIC CLOUD RESOURCES FROM DIFFERENT SUBSCRIPTIONS USING RESERVATIONS

(71) Applicant: VMware, Inc., Palo Alto, CA (US)

(72) Inventors: Dimitar Kostov, Sofia (BG);
Alexander Dimitrov, Sofia (BG);
Kristiyan Georgiev, Sofia (BG); Sabo Rusev, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/682,853

(22) Filed: Nov. 13, 2019

(65) Prior Publication Data

US 2020/0084160 A1     Mar. 12, 2020

Related U.S. Application Data

(63) Continuation of application No. 15/359,368, filed on Nov. 22, 2016, now Pat. No. 10,581,757.

(51) Int. Cl.
*H04L 12/911* (2013.01)
*H04L 29/08* (2006.01)
*H04L 12/24* (2006.01)
*G06F 9/455* (2018.01)

(52) U.S. Cl.
CPC ........ *H04L 47/827* (2013.01); *G06F 9/45558* (2013.01); *H04L 41/0806* (2013.01); *H04L 41/0893* (2013.01); *H04L 67/10* (2013.01); *G06F 2009/4557* (2013.01); *H04L 47/821* (2013.01); *H04L 47/823* (2013.01)

(58) Field of Classification Search
CPC ......... H04L 67/10; H04L 63/10; H04L 63/20; H04L 63/083; H04L 67/1097; H04L 9/0822; H04L 47/70; H04L 63/1433; H04L 41/5054; G06F 9/45558; G06F 2009/45595
See application file for complete search history.

(56) References Cited

U.S. PATENT DOCUMENTS

2011/0138051 A1   6/2011  Dawson et al.
2012/0324070 A1*  12/2012 Campion .............. G06F 9/5066
                                                      709/223

(Continued)

*Primary Examiner* — Brian J. Gillis
*Assistant Examiner* — Thao D Duong
(74) *Attorney, Agent, or Firm* — Patterson + Sheridan, LLP

(57) ABSTRACT

An example method of managing virtualized computing resources provided by a public cloud includes: grouping subscriptions in the public cloud into reservations, each of the reservations including constraints on virtualized computing resources provided by at least one of the subscriptions; allocating the reservations among a plurality of principals; receiving a request to provision a workload from a user associated with a first principal of the plurality of principals, wherein the workload includes metadata describing constraints of the workload; generating a deployment plan for the workload based on the metadata therein and at least one of the reservations allocated to the first principal, the deployment plan specifying a first subscription of the subscriptions; and transmitting a deployment.

15 Claims, 8 Drawing Sheets

(56) References Cited

U.S. PATENT DOCUMENTS

| | | | |
|---|---|---|---|
| 2013/0254360 A1* | 9/2013 | Anderson | H04L 67/10 709/223 |
| 2014/0075031 A1 | 3/2014 | Doering et al. | |
| 2014/0165060 A1* | 6/2014 | Muller | G06F 9/5022 718/1 |
| 2014/0173112 A1* | 6/2014 | Seago | H04L 67/32 709/226 |
| 2018/0075009 A1* | 3/2018 | Baryshnikov | H04L 41/18 |

* cited by examiner

POOLING PUBLIC CLOUD RESOURCES FROM DIFFERENT SUBSCRIPTIONS USING RESERVATIONS

CROSS-REFERENCE TO RELATED APPLICATIONS

This application is a continuation of U.S. patent application Ser. No. 15/359,368, filed Nov. 22, 2016, the entire contents of which are incorporated by reference herein.

BACKGROUND

Cloud architectures are used in cloud computing and cloud storage systems for offering infrastructure-as-a-service (IaaS) cloud services. Examples of cloud architectures include the VMware vCloud Director® cloud architecture software, Amazon EC2™ web service, and OpenStack™ open source cloud computing service. IaaS cloud service is a type of cloud service that provides access to physical and/or virtual resources in a cloud environment. These services provide a tenant application programming interface (API) that supports operations for manipulating IaaS constructs, such as virtual machines (VMs) and logical networks.

A hybrid cloud system aggregates the resource capabilities from both private and public clouds. A private cloud can include one or more customer data centers (referred to herein as "on-premise data centers"). The public cloud can include a multi-tenant cloud architecture providing IaaS cloud services geographically distributed in different regions of the world. In addition, public clouds provide subscription model and companies can purchase multiple subscriptions with different resources and capabilities. In a public cloud system, it is desirable to support VM deployment in the most appropriate subscription of a public cloud. Presently, to implement VM deployment, a customer must first select the subscription to be used within the public cloud and then proceed with deployment of the VM. This process has the disadvantages of requiring significant manual effort and needing for the person doing deployment to have access to the actual subscriptions. Both disadvantages are problematic for enterprises and other organizations have a large number of users and subscriptions.

SUMMARY

One or more embodiments provide techniques for managing public cloud resources. In an embodiment, a method of managing virtualized computing resources provided by a public cloud includes: grouping subscriptions in the public cloud into reservations, each of the reservations including constraints on virtualized computing resources provided by at least one of the subscriptions; allocating the reservations among a plurality of principals; receiving a request to provision a workload from a user associated with a first principal of the plurality of principals, wherein the workload includes metadata describing constraints of the workload; generating a deployment plan for the workload based on the metadata therein and at least one of the reservations allocated to the first principal, the deployment plan specifying a first subscription of the subscriptions; and transmitting a deployment request to the public cloud using the first subscription specified in the deployment plan.

Further embodiments include a non-transitory computer-readable storage medium comprising instructions that cause a computer system to carry out the above method, as well as a computer system configured to carry out the above method.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1A:
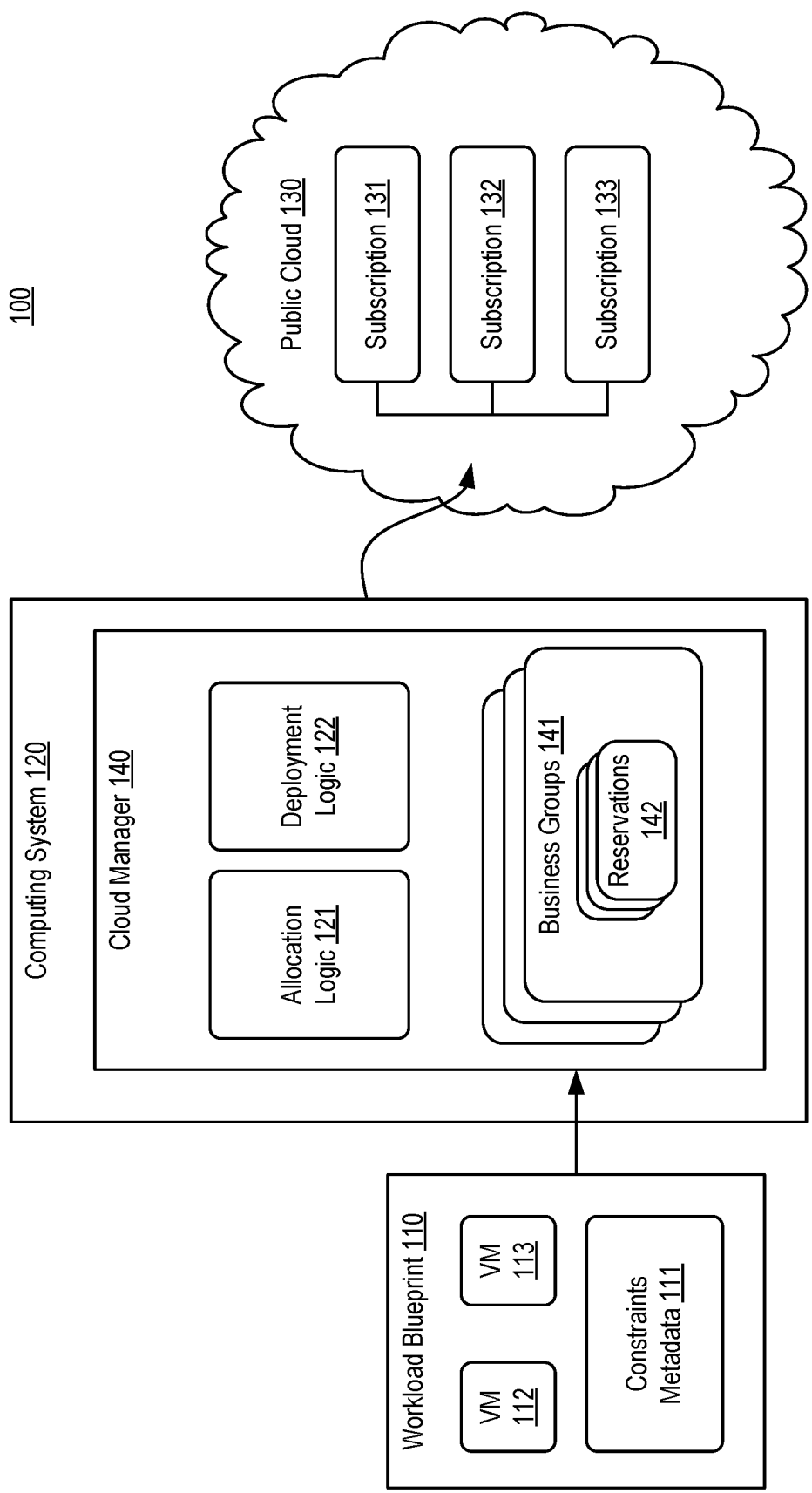
FIG. 1A is a logical block diagram of a cloud management system, according to one embodiment disclosed herein.

FIG. 1A is a logical block diagram of a cloud management system 100, according to one embodiment. Cloud management system 100 includes a computing system 120 and a public cloud 130. An example hardware implementation of computing system 120 and public cloud 130 is described below with respect to FIG. 1B. Public cloud 130 includes virtualized computing resources (also referred to as computing resources) accessible through one or more subscriptions (e.g., subscriptions 131, 132, 133). Virtualized computing resources include compute resources (e.g., central processing unit (CPU) resources), memory resources (e.g., system memory coupled to CPU(s)), storage resources (e.g., hard disk storage, solid state storage, etc.), network resources, and the like. Each subscription 131, 132, 133 grants or governs access to virtualized computing resources of public cloud 130. For example, each subscription 131-133 may represent a Microsoft® Azure subscription or like type public cloud subscription. Each subscription 131-133 comes with its own default limits, constraints, quota, and the like, on the accessible virtualized computing resources.

Computing system 120 includes a cloud manager 140. Cloud manager 140 is software configured to manage virtualized computing resources provided by public cloud 130. An administrator interacts with cloud manager 140 to specify one or more principals, such as business groups 141. Each of the one or more business groups 141 may be associated with an endpoint (discussed below), such as public cloud 130. Each of the one or more business groups 141 is allocated one or more reservations 142. Each reservation 142 is used to allocate virtualized computing resources to one of the business groups 141. Reservations 142 are used to grant a certain amount of virtualized computing resources of a given subscription to a specific business group 141.

A user interacts with cloud manager 140 to specify a workload blueprint 110. The user can be a member of a given business group. Workload blueprint 110 is a request by the user for computing resources, such as a request to provision one or more virtual machines 112, 113. Workload blueprint 110 includes metadata 111. Metadata 111 describes the requirements of the workload (e.g., requirements of virtual machines 112, 113, such as processor, memory, storage, and network requirements). As described further below, metadata 111 may be used as a constraint when choosing an appropriate reservation that satisfies the constraints of workload blueprint 110.

Cloud manager 140 includes allocation logic 121 and deployment logic 122. Allocation logic 121 is configured to choose a reservation 142 based on workload blueprint 110. Deployment logic 122 is configured to deploy virtual machine(s) (e.g., VM 112, 113) based on a reservation 142 chosen by allocation logic 121. Operation of cloud manager 140 is discussed further below. While a specific modular configuration of cloud manager 140 is shown, those skilled in the art will appreciate that cloud manager 140 can have other modular configurations. In general, cloud manager 140 can include one or more modules for performing the functions described herein.

Figure 1B:
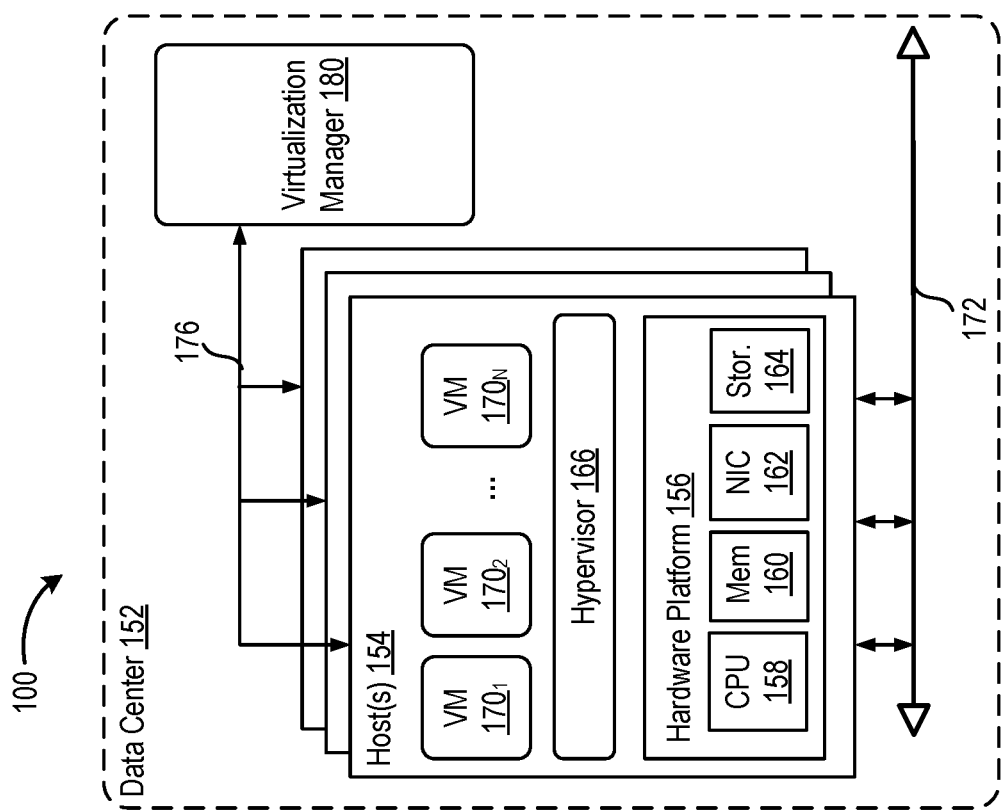
FIG. 1B is a block diagram of a data center, according to one embodiment.

FIG. 1B is a block diagram of a data center 152, according to one embodiment. Data center 152 includes one or more host computer systems ("hosts 154"). Hosts 154 may be constructed on a server grade hardware platform 156, such as an x86 architecture platform. As shown, hardware platform 156 of each host 154 may include conventional components of a computing device, such as one or more processors (CPUs) 158, system memory 160, a network interface 162, storage system 164, and other I/O devices such as, for example, a mouse and keyboard (not shown). CPU 158 is configured to execute instructions, for example, executable instructions that perform one or more operations described herein and may be stored in memory 160 and in local storage. Memory 160 is a device allowing information, such as executable instructions, cryptographic keys, virtual disks, configurations, and other data, to be stored and retrieved. Memory 160 may include, for example, one or more random access memory (RAM) modules. Network interface 162 enables host 154 to communicate with another device via a communication medium, such as a network 172 within data center 152. Network interface 162 may be one or more network adapters, also referred to as a Network Interface Card (NIC). Storage system 164 represents local storage devices (e.g., one or more hard disks, flash memory modules, solid state disks, and optical disks) and/or a storage interface that enables host 154 to communicate with one or more network data storage systems. Examples of a storage interface are a host bus adapter (HBA) that couples host 154 to one or more storage arrays, such as a storage area network (SAN) or a network-attached storage (NAS), as well as other network data storage systems.

Each host 154 is configured to provide a virtualization layer that abstracts processor, memory, storage, and networking resources of hardware platform 156 into multiple virtual machines $170_1$ to $170_N$ (collectively referred to as VMs 170) that run concurrently on the same hosts. VMs 170 run on top of a software interface layer, referred to herein as a hypervisor 166, that enables sharing of the hardware resources of host 154 by VMs 170. One example of hypervisor 166 that may be used in an embodiment described herein is a VMware ESXi™ hypervisor provided as part of the VMware vSphere® solution made commercially available from VMware, Inc. of Palo Alto, Calif. Hypervisor 166 may run on top of the operating system of host 154 or directly on hardware components of host 154.

Data center 152 includes a virtualization management component (depicted in FIG. 1B as virtualization manager 180) that may communicate with hosts 154 via a network, sometimes referred to as a management network 176. In one embodiment, virtualization manager 180 is a computer program that resides and executes in a central server, which may reside in data center 152, or alternatively, running as a VM in one of hosts 154. One example of a virtualization manager is the vCenter Server™ product made available from VMware, Inc. Virtualization manager 180 is configured to carry out administrative tasks for data center 152, including managing hosts 154, managing VMs 170 running within each host 154, provisioning VMs, migrating VMs from one host to another host, and load balancing between hosts 154.

In an embodiment, computing system 120 is implemented using an instance of data center 152. Cloud manager 140 can be implemented by one or more VMs 170, by virtualization manager 180, or both by VM(s) 170 and virtualization manager 180. In another embodiment, cloud manager 140 can be implemented on one or more non-virtualized computer systems (e.g., computers having an operating system executing directly on the hardware platform). In an embodiment, public cloud 130 is implemented using an instance of data center 152. However, it is to be understood that public cloud 130 can have various hardware architectures, including those that are similar to data center 152 shown in FIG. 1B or different from data center 152. In general, public cloud 130 provides subscriptions to virtualized computing resources, where each subscription has different capacities, costs, and capabilities (e.g., solid state storage versus hard disk storage; different numbers of CPUs; different amounts of memory; etc.).

Figure 2:
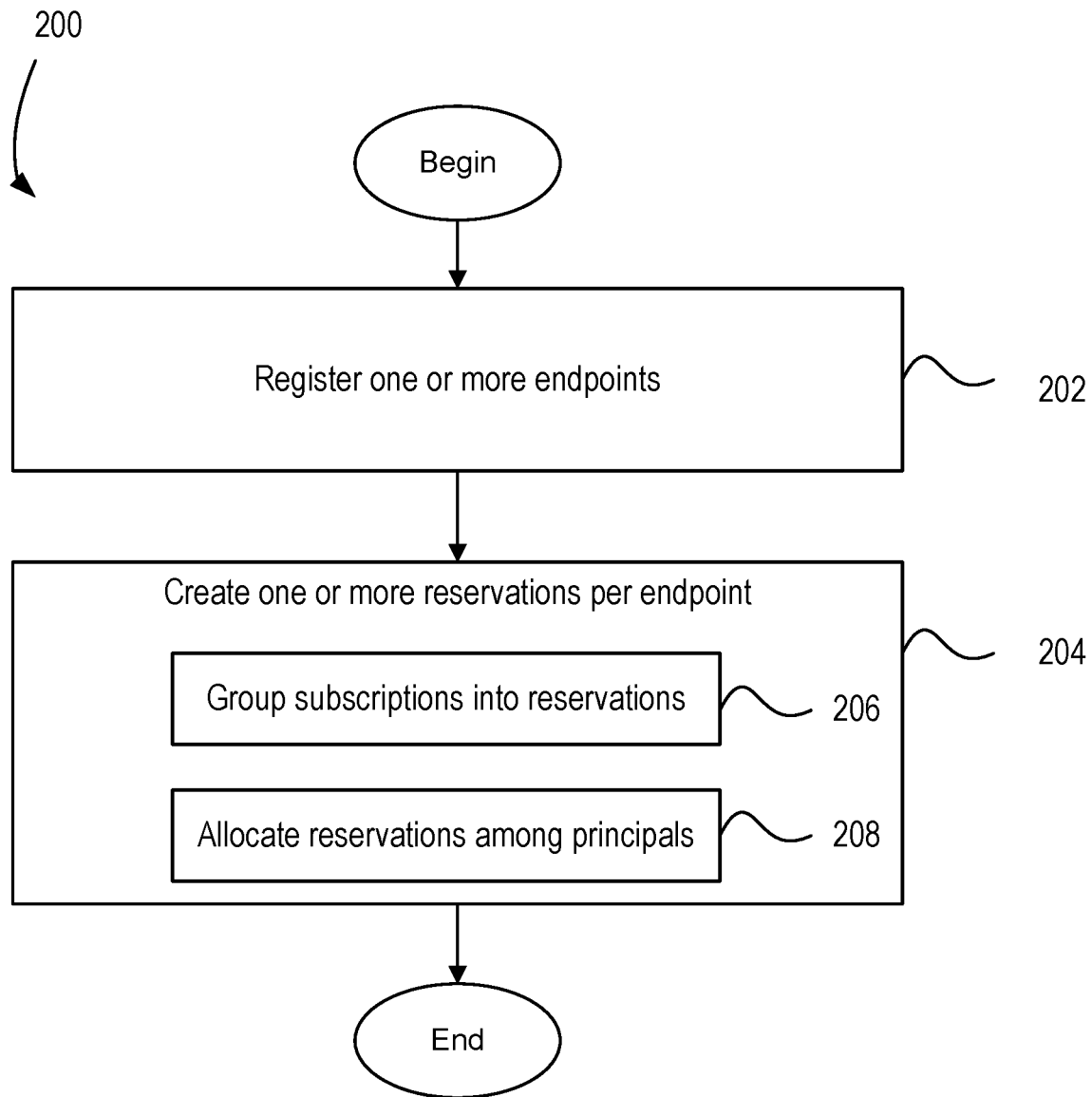
FIG. 2 is a flow diagram illustrating a method of managing public cloud subscriptions, according to one embodiment.

FIG. 2 is a flow diagram illustrating a method 200 of managing public cloud subscriptions, according to one embodiment. At step 202, an administrator interacts with cloud manager 140 to register one or more endpoints. Each endpoint is used for provisioning workloads backed by virtualized computing resources of public cloud 130. For example, each endpoint may be backed by a subscription defined in public cloud 130, such as Microsoft® Azure or like type public cloud subscription. Endpoints may be defined per principal, such as per tenant. For example, each tenant may be a certain organization (e.g., enterprise or organization within an enterprise). Each endpoint is associated with a unique public cloud subscription such that there is a one-to-one correspondence between endpoints and subscriptions (e.g., subscriptions 131, 132, 133 in public cloud 130). Each subscription grants and governs access to services and resources of the endpoint. For example, each endpoint can be mapped to a unique Microsoft® Azure subscription or like type public cloud subscription. In general, an administrator may configure multiple endpoints mapped to different public cloud subscriptions. Each subscription comes with its own default limits, constraints, quota, and the like on the available virtualized resources.

The administrator then creates one or more reservations per endpoint (step 204). Reservations are used to allocate resources to principals, such as business group(s) of a tenant. In an embodiment, at step 206, the administrator groups the subscriptions into reservations and at step 208 allocates the reservations among principals. For example, for each reservation, the administrator sets the name of the reservation, selects the business group for the reservation, selects a priority for the reservation, assigns the reservation to a specific endpoint, and defines a reservation policy. The reservation policy defines an amount of compute resources, memory, storage, and the like associated with the reservation. Each reservation is either mapped to an entire subscription or carves out a portion of a subscription. For example, each reservation can expose resources less than the limits/quotas set by the subscription. In another embodiment, the reservation exposes the default limits and current allocations numbers of the underlying subscription.

In an embodiment, the administrator creates a hierarchical policy using reservations. The administrator may create reservations that limit the consumption of public cloud resources to a desired level. For example, the administrator may create a 500 GHz CPU power reservation, 100 GB memory reservation, etc. This allows a company having a single public cloud subscription to be logically divided between departments or individuals. The administrator may create a content filter. For example, although the public cloud may allow access to storage of type hard disk drive (HDD) and solid-state drive (SSD), a specific reservation may be limited to only allowing access to HDD storage types. Thus, business groups falling under this reservation will only use storage of the type HDD when provisioning a virtual machine using that reservation. Those skilled in the art will appreciate that an administrator can implement various hierarchical policies using reservations as described herein.

Figure 3C:
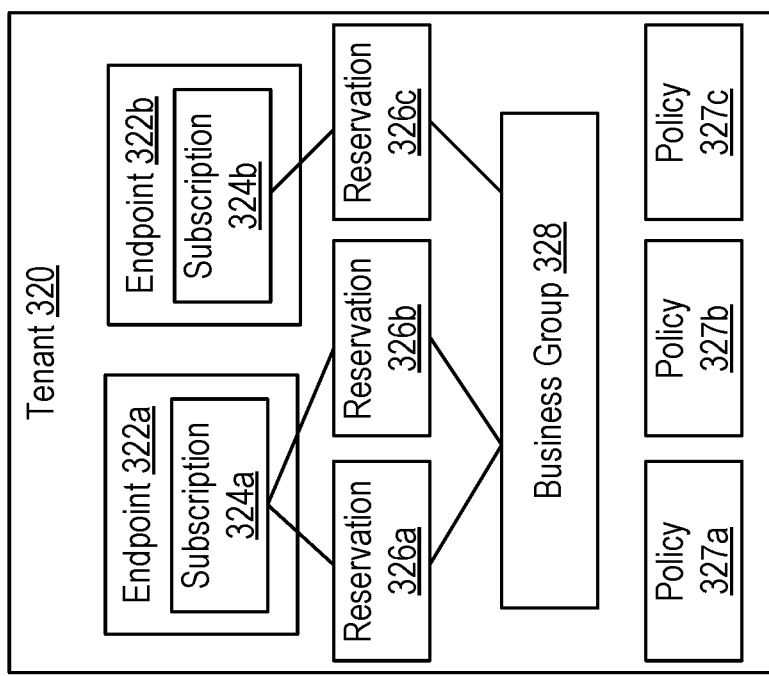
FIGS. 3A-3C are block diagrams illustrating examples of tenant layouts, according to one or more embodiments described herein.
Figure 3B:
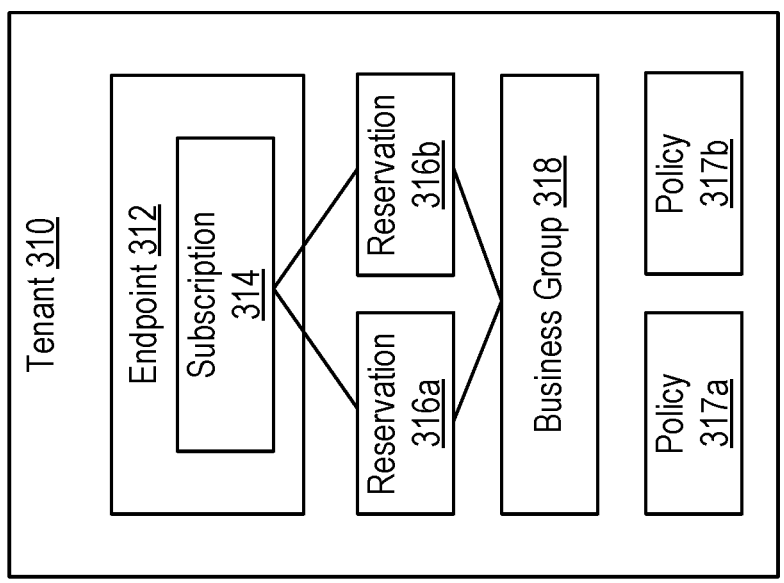
Figure 3A:
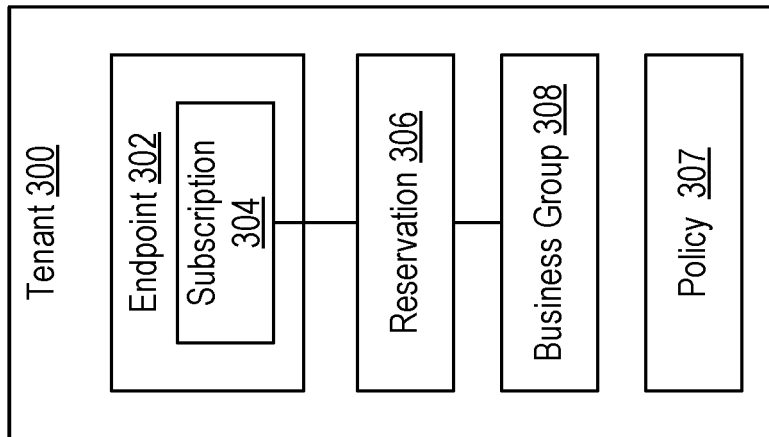

FIGS. 3A-3C are block diagrams illustrating examples of tenant layouts, according to one or more embodiments. FIG. 3A illustrates a tenant 300, according to one embodiment. Tenant 300 includes an endpoint 302 having a subscription 304. For example, subscription 304 may be a Microsoft® Azure subscription or like public cloud subscription. For tenant 300, an administrator created reservation 306. Reservation 306 includes one or more policies 307 set by the administrator. The administrator maps reservation 306 to subscription 304. The administrator assigns business group 308 to reservation 306.

FIG. 3B illustrates a tenant 310, according to one embodiment. Tenant 310 includes an endpoint 312 having a subscription 314, according to one embodiment. For tenant 310, an administrator created reservations 316a and 316b. Reservation 316a includes one or more policies 317a set by the administrator. Reservation 316b includes one or more policies 317b set by the administrator. The administrator maps reservations 316a and 316b to subscription 314. The administrator assigns business group 318 to reservation 316a and reservation 316b.

FIG. 3C illustrates a tenant 320, according to one embodiment. Tenant 320 includes endpoint 322a and endpoint 322b. Endpoint 322a has a subscription 324a. Endpoint 322b has a subscription 324b. For tenant 320, an administrator created reservations 326a, 326b, and 326c. Reservation 326a includes one or more policies 327a. Reservation 326b includes one or more policies 327b. Reservation 326c includes one or more policies 327c. The administrator maps reservations 326a and 326b to subscription 324a. The administrator maps reservation 326c to subscription 324b. The administrator assigns business group 328 to reservations 326a, 326b, and 326c.

FIGS. 3A-3C show examples of principals that have a tenant/business group hierarchy. Those skilled in the art will appreciate that the principals associated with reservations can have other forms (e.g., different hierarchies having more that two levels or structures having only one level).

Figure 4:
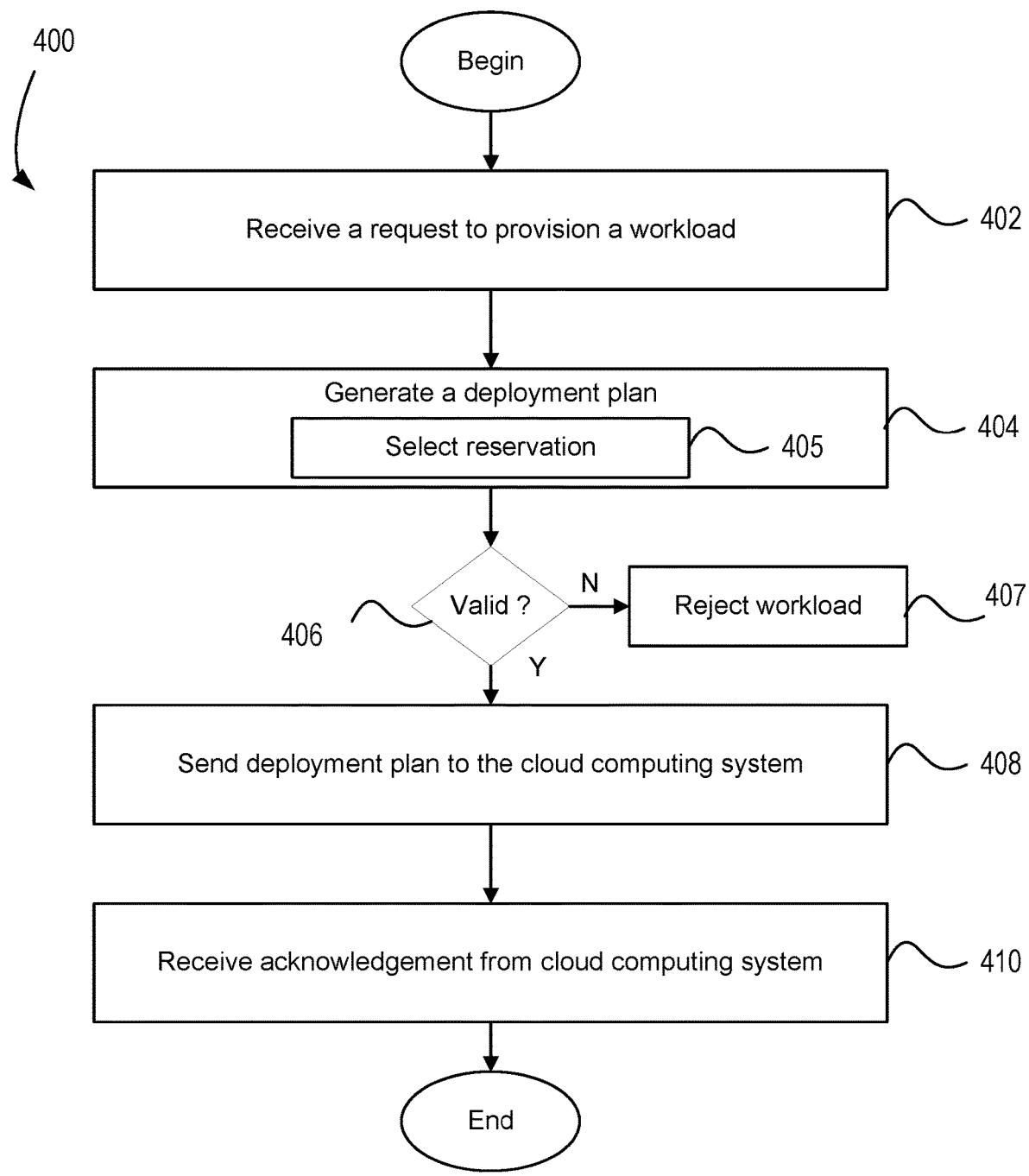
FIG. 4 is a flow diagram illustrating a method of provisioning a workload, according to one embodiment.

FIG. 4 is a flow diagram illustrating a method 400 of provisioning a workload, according to one embodiment. At step 402, cloud manager 140 receives a request to provision a workload. For example, a user can interact with cloud manager 140 to specify workload blueprint 110. The workload has its constraints described in metadata (e.g., constraints metadata 111). The metadata is used as a constraint in choosing an appropriate reservation that satisfies of the constraints of the workload. For example, cloud manager 140 may receive a request from a user desiring to provision one or more VMs, each having particular resource requirements (e.g., particular CPU, memory, storage, and network requirements).

At step 404, cloud manager 140 generates a deployment plan. The deployment plan includes a public cloud subscription that may be used to satisfy the requirements of the workload. In an embodiment, at step 405, allocation logic 121 selects a reservation associated with the user that includes available computing resources and satisfies the constraints of the requested workload. An embodiment of the reservation selection process is described below with respect to FIG. 6.

Figure 5:
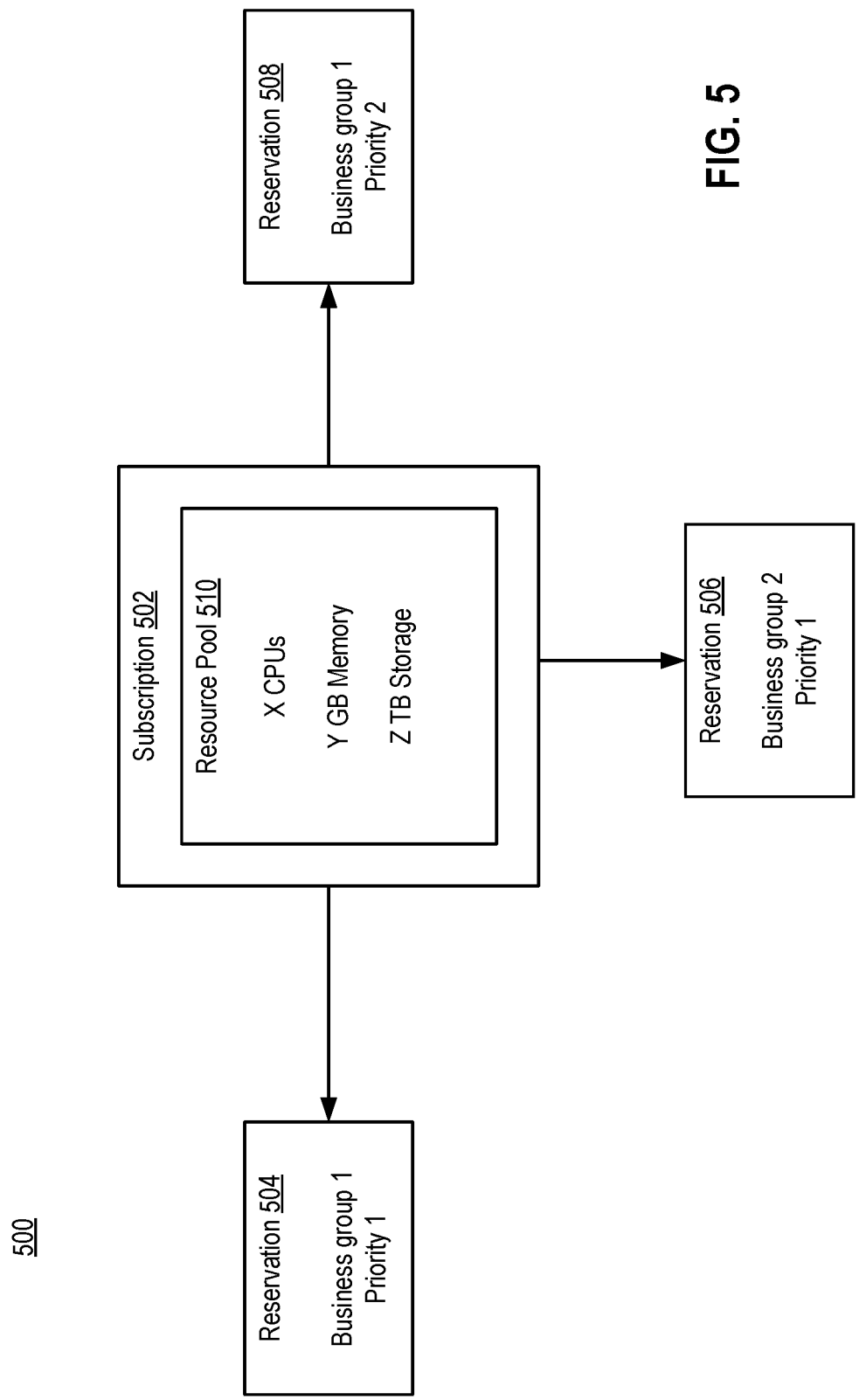
FIG. 5 illustrates a block diagram of a subscription having three reservations, according to one embodiment disclosed herein.

For example, an end user may be entitled to three different reservations. FIG. 5 illustrates a block diagram 500 of a subscription 502 having three reservations 504, 506, 508 available to the user. When a user requests to provision a workload, the user does not pick an individual public cloud subscription to provision the resources. Rather, the user generally specifies the type of endpoint for the workload (e.g., public cloud 130), which is agnostic of any particular subscription and its associated resources. Cloud manager 140 selects a public cloud subscription based on the entitled reservations and the constraints of the resources. From the user's point of view, the user has access to pools of virtualized computing resources based on the assigned reservations, rather than to individual public cloud subscriptions.

Subscription 502 includes a resource pool 510. Resource pool 510 identifies the total resources available for subscription 502. Total resources of subscription 502 are allocated among reservations 504, 506, and 508. In the present example, resource pool 510 includes X CPUs, Y GB memory, and Z TB of storage. Each reservation 504, 506, and 508 is allocated the entire resource pool 510. Further, each reservation 504, 506, and 508 is assigned a priority level. For example, in the embodiment illustrated, reservations 504 and 506 have a priority level 1 and reservation 508 has a priority level 2.

Assume cloud manager 140 receives a workload request from a user in business group 1 and that business group 1 is allocated reservations 504 and 508. The user is entitled to two of the three reservations, each representing a public cloud subscription. When the user requests to provision a workload, the user does not pick an individual public cloud subscription. Rather, cloud manager 140 automatically selects the subscription based on the entitled reservations, the constraints of the workload, and the availability of the computing resources. Notably, since each reservation has access to all computing resources of resource pool 510, cloud manager 140 checks to determine if sufficient computing resources are available. Cloud manager 140 generates the deployment plan based on a selected reservation. If there are no reservations having available resources that satisfy the constraints of the workload, then cloud manager 140 cannot generate a valid deployment plan. In an embodiment, the entitled reservations for a user can be prioritized based on priority level. If multiple reservations satisfy the workload constraints, then cloud manager 140 can pick the reservation with the highest priority. Reservations with higher priority can include higher performance resources, for example.

Returning to FIG. 4, at step 406, cloud manager 140 determines whether a valid deployment plan has been created. If not, method 400 proceeds to step 407, where cloud manager 140 rejects the request to provision the workload. Otherwise, method 400 proceeds to step 408.

At step 408, cloud manager 140 sends a deployment request to public cloud 130 using the corresponding subscription of the deployment plan. For example, deployment logic 122 can generate a deployment request, which includes the requirements for one or more virtual machines to be provisioned using a particular subscription of public cloud 130. At step 410, cloud manager 140 receives acknowledgement from public cloud 130. Cloud manager 140 can send an acknowledgement to the user along with information for accessing the provisioned resources (e.g., provisioned VM(s)).

Figure 6:
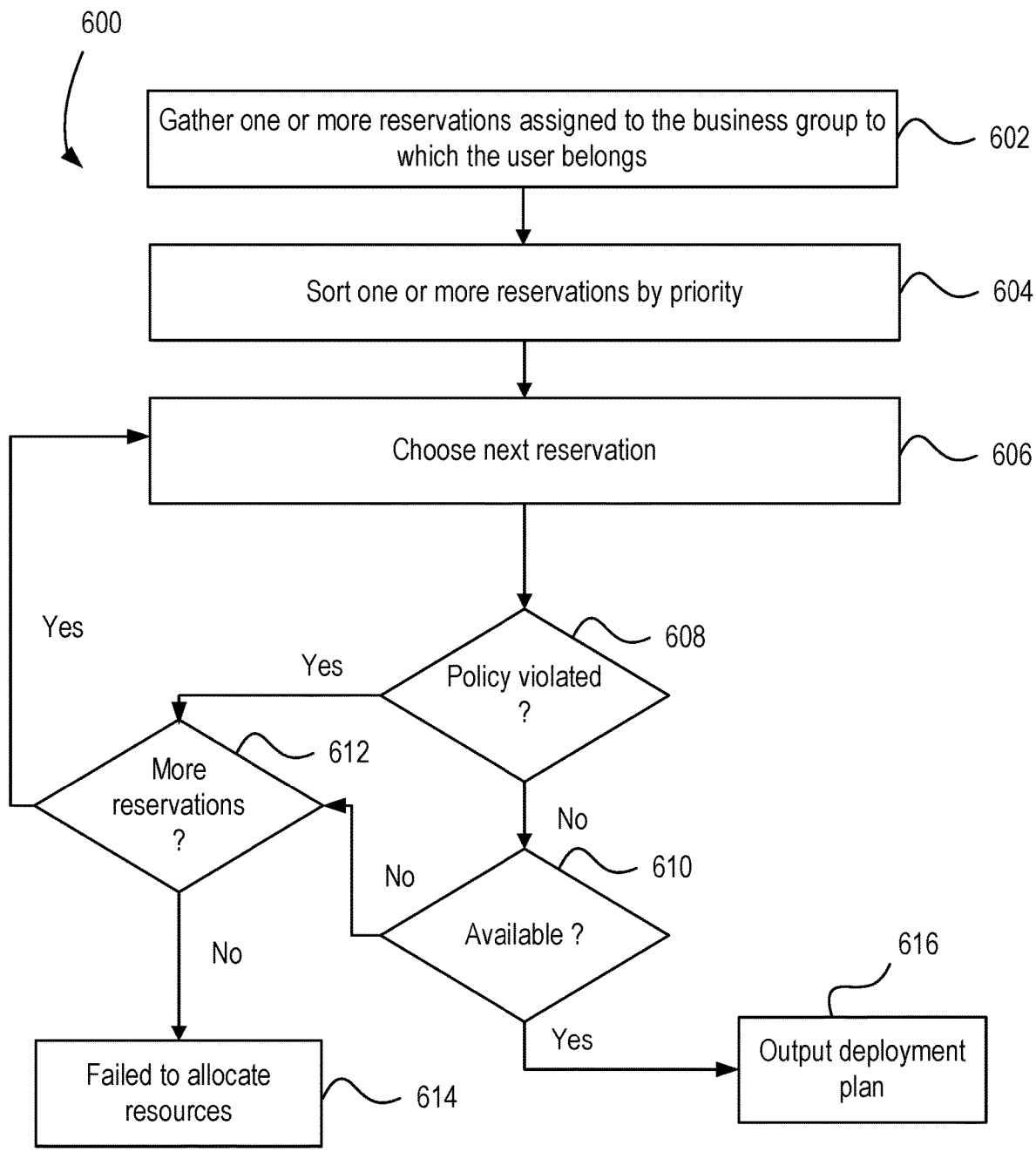
FIG. 6 is a flow diagram depicting a method of selecting a reservation according to an embodiment.

FIG. 6 is a flow diagram depicting a method 600 of selecting a reservation according to an embodiment. Method 600 can be performed at step 405 in method 400 described above. At step 602, cloud manager 140 identifies all entitled reservations for the user that requested provisioning of the workload. For example, cloud manager 140 can gather the reservations assigned to the business group to which the user belongs.

Figure 7:
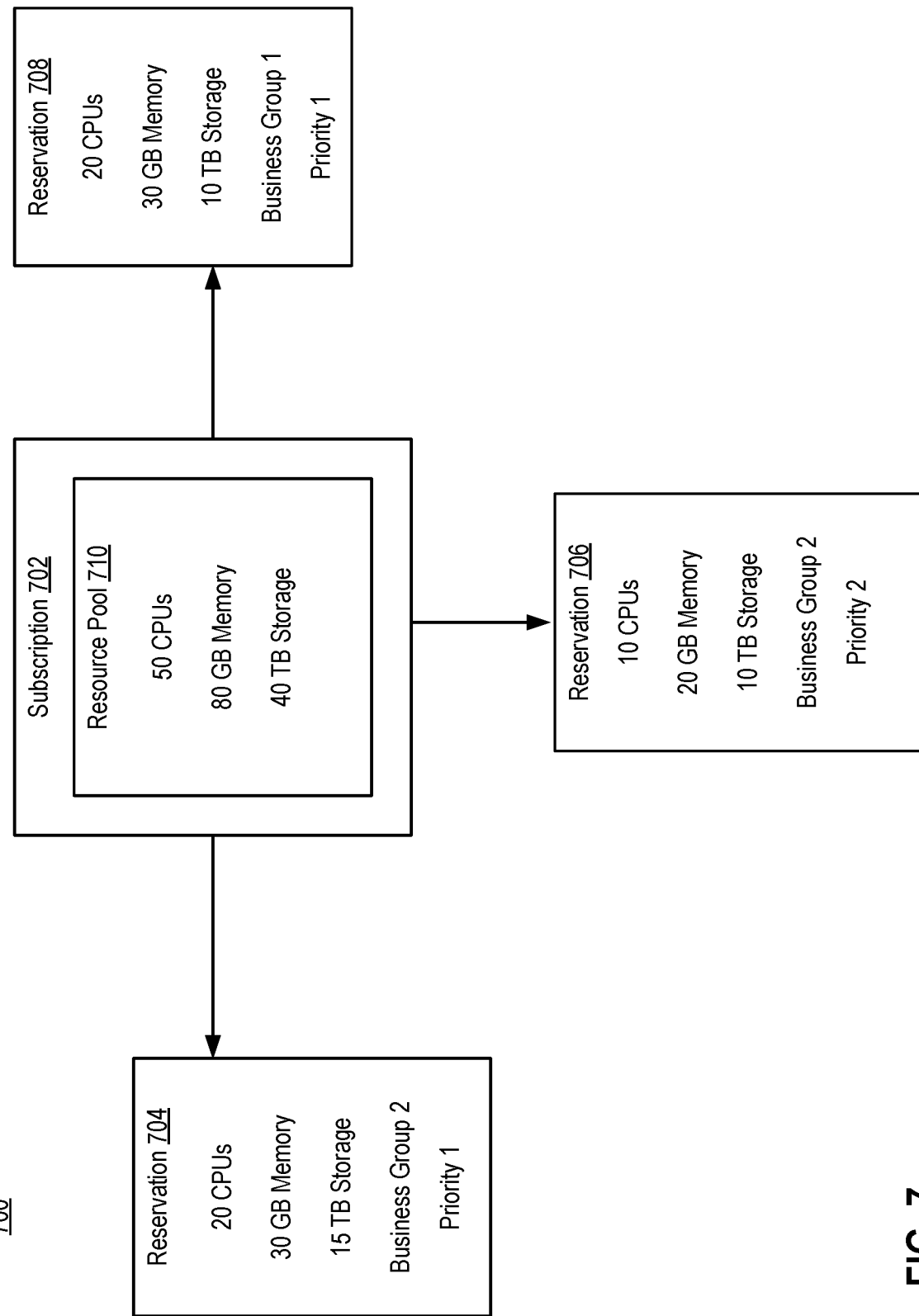
FIG. 7 illustrates a block diagram of a subscription having three reservations, according to one embodiment disclosed herein.

FIG. 7 illustrates a block diagram 700 of a subscription 702 having three reservations 704, 706, 708 available to the end user. Subscription 702 includes a resource pool 710. Resource pool 710 identifies the total resources available for subscription 702. For example, as illustrated, resource pool identifies 50 CPUs, 80 GB of memory, and 40 TB of storage as the total resources available for subscription 702. Reservation 704 has a reservation policy limiting compute resources to 20 CPUs, memory to 30 GB, and storage to 15 TB. Reservation 706 has a reservation policy limiting compute resources to 10 CPUs, memory to 20 GB, and storage to 10 TB. Reservation 708 has a reservation policy limiting compute resources to 20 CPUs, memory to 30 GB, and storage to 10 TB.

When cloud manager 140 gathers all entitled reservations, cloud manager 140 identifies the business group to which the user belongs. For example, assuming the user belongs to business group 2, cloud manager 140 gathers reservation 704 and reservation 706 because business group 2 is assigned to those reservations. In an embodiment, after the entitled reservations are gathered, cloud manager 140 sorts gathered reservations by priority (step 604). For example, cloud manager 140 ranks reservation 704 ahead of reservation 706 because reservation 704 has priority 1 and reservation 706 has priority 2.

Cloud manager 140 chooses a first reservation from the gathered reservations to determine whether the reservation policies of the first reservation and the resource availability are satisfied when compared to the workload request of the user (step 606). For example, cloud manager 140 can begin with reservation 704 as it is the highest priority reservation in the gathered group of entitled reservation. Cloud manager determines whether the reservation policy of reservation 704 is met (step 608).

For example, cloud manager 140 receives a workload request from a user in business group 1 that requires 15 CPUs of compute resources, 20 GB of memory, and 10 TB of storage. Cloud manager 140 determines whether the reservation policy associated with reservation 704 satisfies the workload requirements. As illustrated, reservation 704 is able to handle the request because the workload requirements do not violate the reservation policy for reservation 704.

After cloud manager 140 determines that the workload request does not violate the reservation policy, at step 610, cloud manager 140 determines whether the reservation includes available computing resources. For example, the workload request requires 15 CPUs, 20 GB of memory, and 10 TB of storage. Reservation policy for reservation 704 limits workload requests to 20 CPUs, 30 GB of memory, and 15 TB of storage. If, for example, a previously accepted workload request requiring 6 CPUs was granted for reservation 704, the user's workload request for 15 CPUs would be rejected for reservation 704 because the total CPU resources between the two workload requests (i.e., 15 CPUs and 6 CPUs) would violate the overall reservation quota of 20 CPUs. In this example, assume that the workload request of 20 CPUs, 30 GB of memory, and 15 TB of storage is the only workload request received for reservation 704. As such, the overall quota for reservation 704 is not violated.

If at step 610 the resources of the reservation are available, method 600 proceeds to step 616, where cloud manager 140 outputs the deployment plan based on the selected reservation. If the resources of the reservation are not available, method 600 proceeds to step 612. At step 612, cloud manager 140 determines whether there are any remaining reservations in the list of entitled reservations. If there are not any remaining reservations, cloud manager 140 issues an error statement that the cloud manager 140 failed to allocate the resources requested (step 614). If there are remaining reservations (e.g., reservation 706), the method reverts to step 606 and cloud manager 140 chooses the next reservation to analyze.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system—level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless of the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method of managing virtualized computing resources provided by a public cloud, comprising:

mapping subscriptions in the public cloud to reservations, wherein each of the reservations is mapped to an entire subscription or to a portion of a subscription, wherein each subscription corresponds to a resource pool, wherein a portion of a subscription corresponds to a subset of the resource pool associated with the subscription, wherein at least one of the reservations corresponds to a first portion of at least one of the subscriptions;

allocating the reservations among a plurality of principals;

receiving a request to provision a workload from a user associated with a first principal of the plurality of principals, wherein the workload includes metadata describing constraints of the workload;

generating a deployment plan for the workload based on the metadata therein and the at least one of the reservations, the deployment plan specifying the at least one of the subscriptions, wherein generating the deployment plan comprises:
selecting the at least one of the reservations from one or more reservations that satisfy the constraints of the workload, wherein the constraints of the workload specify required computing resources, and wherein the at least one of the reservations selected includes constraints on the virtualized computing resources that match the constraints of the workload; and transmitting a deployment request to the public cloud using the at least one of the subscriptions specified in the deployment plan.

2. The method of claim 1, wherein each of the one or more reservations includes a priority level, and wherein generating the deployment plan comprises:

prioritizing the at least one of the reservations allocated to the first principal based on the priority level of each of the one or more reservations.

3. The method of claim 2, wherein selecting the at least one of the reservations is based on the at least one of the reservations having a highest priority among the one or more reservations.

4. The method of claim 1, wherein the first principal is a business group, and wherein the user is a member of the business group.

5. The method of claim 1, further comprising:
receiving acknowledgement from the public cloud that the deployment request is granted.

6. A computer system in communication with a public cloud providing virtualized computing resources, the computer system comprising:
a central processing unit (CPU);
a memory storing program code, which, when executed on the CPU, causes the computer system to perform a method comprising:
mapping subscriptions in the public cloud to reservations, wherein each of the reservations is mapped to an entire subscription or to a portion of a subscription, wherein each subscription corresponds to a resource pool, wherein a portion of a subscription corresponds to a subset of the resource pool associated with the subscription, wherein at least one of the reservations corresponds to a first portion of at least one of the subscriptions;
allocating the reservations among a plurality of principals;
receiving a request to provision a workload from a user associated with a first principal of the plurality of principals, wherein the workload includes metadata describing constraints of the workload;
generating a deployment plan for the workload based on the metadata therein and the at least one of the reservations, the deployment plan specifying the at least one of the subscriptions, wherein generating the deployment plan comprises:
selecting the at least one of the reservations from one or more reservations that satisfy the constraints of the workload, wherein the constraints of the workload specify required computing resources, and wherein the at least one of the reservations selected includes constraints on the virtualized computing resources that match the constraints of the workload; and
transmitting a deployment request to the public cloud using the at least one of the subscriptions specified in the deployment plan.

7. The computer system of claim 6, wherein each of the one or more reservations includes a priority level, and wherein generating the deployment plan comprises:
prioritizing the at least one of the reservations allocated to the first principal based on the priority level of each of the one or more reservations.

8. The computer system of claim 7, wherein selecting the at least one of the reservations is based on the at least one of the reservations having a highest priority among the one or more reservations.

9. The computer system of claim 6, wherein the first principal is a business group, and wherein the user is a member of the business group.

10. The computer system of claim 6, wherein the method further comprises:
receiving acknowledgement from the public cloud that the deployment request is granted.

11. A non-transitory computer readable medium comprising instructions, which when executed in a computer system, cause the computer system to carry out a method of managing virtualized computing resources provided by a public cloud, the method comprising:
mapping subscriptions in the public cloud to reservations, wherein each of the reservations is mapped to an entire subscription or to a portion of a subscription, wherein each subscription corresponds to a resource pool, wherein a portion of a subscription corresponds to a subset of the resource pool associated with the subscription, wherein at least one of the reservations corresponds to a first portion of at least one of the subscriptions;
allocating the reservations among a plurality of principals;
receiving a request to provision a workload from a user associated with a first principal of the plurality of principals, wherein the workload includes metadata describing constraints of the workload;
generating a deployment plan for the workload based on the metadata therein and the at least one of the reservations, the deployment plan specifying the at least one of the subscriptions wherein generating the deployment plan comprises:
selecting the at least one of the reservations from one or more reservations that satisfy the constraints of the workload, wherein the constraints of the workload specify required computing resources, and wherein the at least one of the reservations selected includes constraints on the virtualized computing resources that match the constraints of the workload; and
transmitting a deployment request to the public cloud using the at least one of the subscriptions specified in the deployment plan.

12. The non-transitory computer readable medium of claim 11, wherein each of the one or more reservations includes a priority level, and wherein generating the deployment plan comprises:
prioritizing the at least one of the reservations allocated to the first principal based on the priority level of each of the one or more reservations.

13. The non-transitory computer readable medium of claim 12, wherein selecting the at least one of the reservations is based on the at least one of the reservations having a highest priority among the one or more reservations.

14. The non-transitory computer readable medium of claim 11, wherein the first principal is a business group, and wherein the user is a member of the business group.

15. The non-transitory computer readable medium of claim 11, wherein the method further comprises:
receiving acknowledgement from the public cloud that the deployment request is granted.

* * * * *